Jan. 24, 1961 W. PALMER 2,969,538
DUAL PURPOSE NAVIGATION SYSTEM
Filed Dec. 13, 1956 4 Sheets-Sheet 1

INVENTOR
WINSLOW PALMER
BY
ATTORNEY

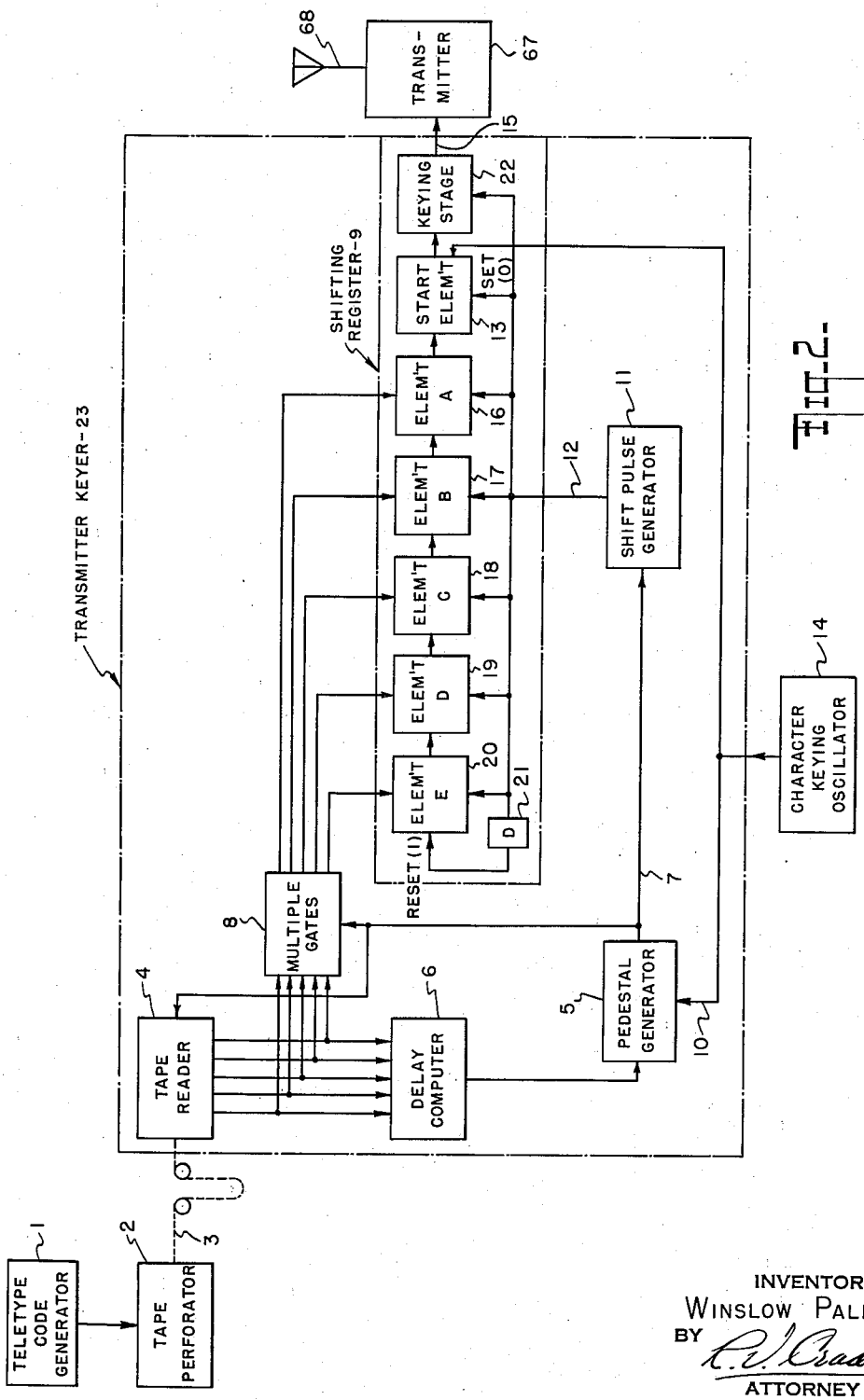

Jan. 24, 1961 W. PALMER 2,969,538
DUAL PURPOSE NAVIGATION SYSTEM
Filed Dec. 13, 1956 4 Sheets-Sheet 4
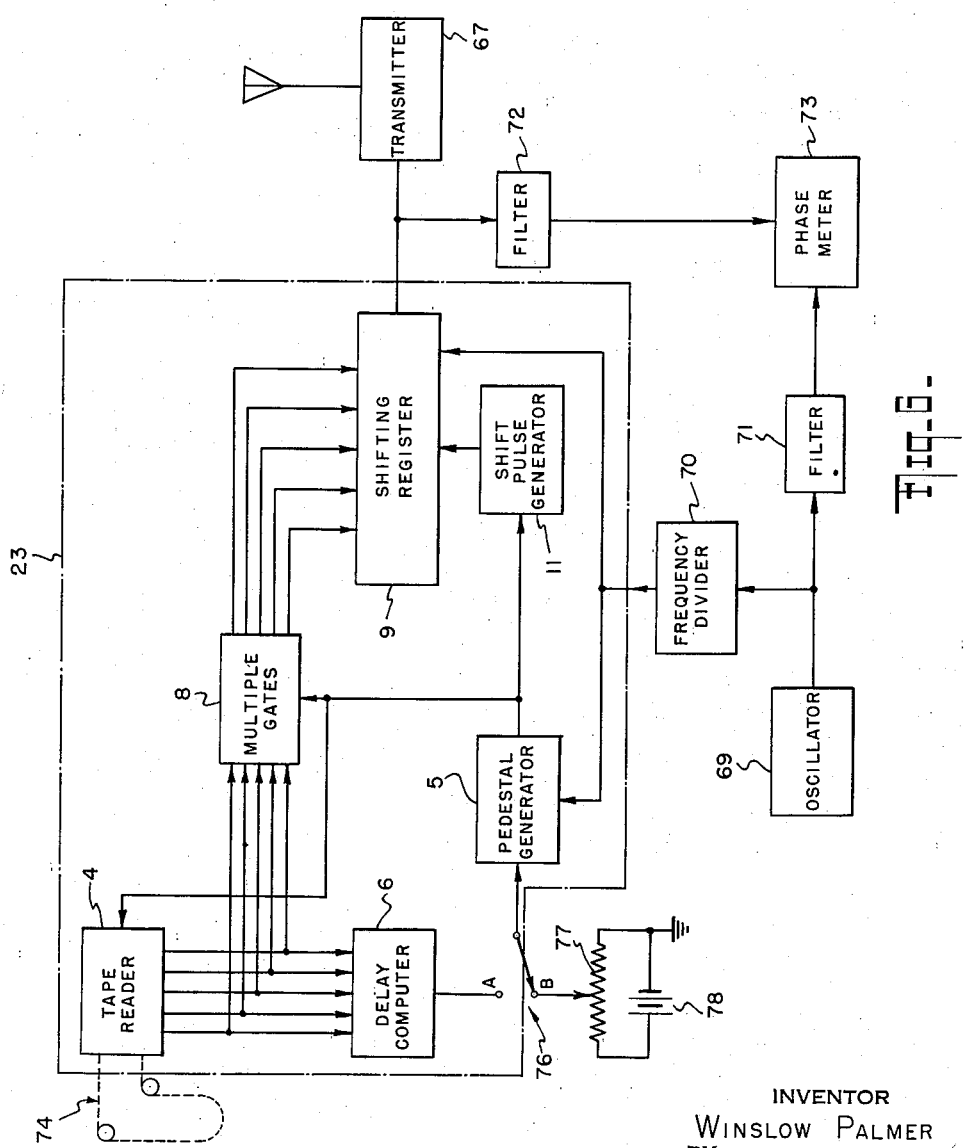
INVENTOR
WINSLOW PALMER
BY
*C. W. Craddock*
ATTORNEY United States Patent Office 2,969,538
Patented Jan. 24, 1961

2,969,538

DUAL PURPOSE NAVIGATION SYSTEM

Winslow Palmer, Amityville, N.Y., assignor to Sperry Rand Corporation, a corporation of Delaware Filed Dec. 13, 1956, Ser. No. 628,022

10 Claims. (Cl. 343—105)

The invention relates to radio navigation systems in general, and more particularly to such systems wherein the phase of received radio signals, transmitted from a plurality of fixed locations, are compared for purposes of position finding and navigation.

Among the many radio navigation systems known in the art are those which utilize phase information contained in transmitted signals. The location of an unknown receiving point may be determined by the intersection of contours of constant phase angle generated by signals transmitted from three or more spaced transmitters. For purposes of illustrating such a phase-responsive system, it is assumed that three spaced transmitters of known location are utilized. Each transmitter may be distinguished on the basis that it emits a carrier of characteristic frequency. Each transmitted carrier, in turn, may be modulated by waves having a common frequency, which waves are in phase at their respective transmitter locations.

Since the phase of a radio wave is retarded by the time of medium transmission, due to the finite velocity with which radio waves are propagated, the phase of the demodulated signal received from a first station will lag through an angle dependent upon the distance between the first station and the receiving point, while the phase of the demodulated signal received from a second station will lag by another angle dependent on the distance between the second station and the receiving point. Contours of constant phase difference result whose loci define a family of hyperbolae with the first and second stations as foci. Measurement of the phase angle between two demodulated signals at the receiving point places the receiver on a particular contour of constant phase. When two such contours are determined, for example, between signals from the first and second stations and between signals from the first and third stations, intersecting phase contours will define the location of the receiver.

Apparatus for the generation of transmitted signals in prior art systems such as just described are designed to accomplish only a navigational purpose. It would be convenient, however, if the modulated waves utilized for navigation were components of some other signals having the requisite phase stability, as used for communication for example. In such a case, the transmitting apparatus, the receiving apparatus, and the radio spectrum could be utilized for two purposes, without mutual interference.

It is the general object of the invention to provide a radio navigation system of the phase-difference measurement type.

A more specific object is to provide radio navigation system of the phase-difference measurement type wherein a majority of apparatus is common with that required for communication purposes.

Another object is to provide a radio navigation system of the phase-difference measurement type whose purpose is concealed by conventional modulations serving other functions.

Yet another object is to phase stabilize a prominent frequency component of a coded transmitted signal.

An additional object is to synchronize the prominent frequency component of coded signals transmitted by a plurality of stations.

A further object is to provide a receiver adapted to selectively but simultaneously respond to each of the communication and navigation modulation of received signals.

These and other objects of the present invention, as will become apparent as the specification proceeds, are accomplished by the provision of apparatus to modify the standard transmission of a coded signal to phase stabilize a prominent frequency component thereof, based upon an analysis of the message prior to transmission. By way of example, a conventional teletype communication system is disclosed which may utilize any convenient modulation technique such as amplitude or frequency shift keying. Such systems ordinarily are keyed at a more or less constant rate and the frequency spectrum of the transmitted characters contains strong components at frequencies harmonically related to the character keying rate. Generally, however, the phase of such frequency components of the transmitted signal spectrum will be more or less random, from instant to instant, depending upon the particular sequence of characters being transmitted. The present invention operates to control the transmission rate so that a strong harmonic component of the keying frequency maintains a constant phase in order to establish a stable phase interference pattern between such signals which may be transmitted from a plurality of communication transmitters. When the prominent frequency components are phase synchronized at the locations of the transmitters, measurement of the phase difference between two signals as received at an unknown location then establishes an observer at the receiving point on a particular phase contour. Two such measurements made along intercepting phase contours then establishes the position of the observer.

According to a representative embodiment of the present invention, each character comprising a teletype coded message is analyzed prior to transmission and a control voltage is produced whose magnitude is proportional to the known phase of a prominent frequency component thereof. The control voltage is then employed to adjust the duration of the "stop" pulse of each preceding character so that said prominent frequency component of its respectively succeeding character is phase stabilized, from character to character, upon transmission. The invention also discloses means for synchronizing the prominent frequency components between a plurality of spaced transmitters. Additionally, receiving means are shown for measuring the phase displacement between such synchronized prominent frequency components at a remote receiver for purposes of determining the position of said remote receiver.

The invention will be more fully understood from the following description with the aid of the appended figures of which:

Fig. 2 is a schematic diagram of a master communication transmitter as modified in accordance with the present invention;

Fig. 6 is a schematic diagram of test apparatus useful in adjusting certain parameters of the apparatus of Figs. 2 and 3.

Figure 1:
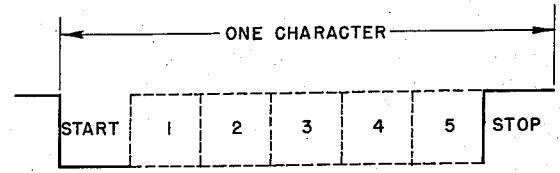
Fig. 1 is a time diagram of a standard teletype character useful in explaining the mode of operation of the invention.

The process of stabilizing a component signal suitable for navigation purposes out of a coded communication message may be illustrated, for example, by considering a Start-Stop teletype code, a similar consideration being required for other codes. In the Start-Stop code, as shown in Fig. 1, each character consists of a code group of seven elements, the first of which is always a space denoting the start of the element group comprising the character. The next five elements are individually either a mark or a space depending upon the character being sent. The last element is always a mark of indeterminate length whose termination always signifies the beginning of the start element of the next coded character.

If any one code character were repeated indefinitely, its frequency spectrum would contain a component signal related to the code element lengths, the magnitude and phase of the component signal being dependent on the particular code group. Those characters having alternate mark and space elements would, of course, have the strongest components at the element frequency. If, however, a sequence of characters selected at random were transmitted, the element frequency components of the characters would bear a more or less random phase relationship with respect to each other.

To obtain a continuous strong component of suitable phase, it is necessary that the transmission timing of each character be adjusted relative to the transmission of the other characters so that the element frequency components of all characters are transmitted in phase.

In a common Start-Stop teletype, each character always starts with a space and ends with a mark, as previously mentioned. The beginning of the Start element releases the decoding commutator embodied in the teletype receiver, which commutator makes one full cycle during the interval of the character and then is held until the arrival of the next Start element. Thus, the phase of each character, with respect to some timing standard, can be adjusted by varying the time duration of the preceding Stop element without interfering with the normal operation of teletype receiver except insofar as an additional variable delay is introduced. In other words, a normal teletype signal sequence can be converted into a sequence useful as a navigational signal by delaying the start of each character at the transmitter so as to bring the element frequency component of the character into phase with a timing standard.

The manner in which the transmitted character element frequency component is brought into phase will be explained in the following description with the aid of Fig. 2.

In Fig. 2, the message to be transmitted is generated in standard teletype code generator 1 whose output is applied to conventional tape perforator 2. Perforator 2 transcribes the message to be transmitted in the form of a punched teletype tape 3. The message on tape 3 is put into a tape reader 4 which, in response to the trailing edges of signals derived from pedestal generator 5, transmits one character at a time of the coded message to delay computer 6. Delay computer 6 may, for example, assume the form of a relay tree, well known in the art, for converting digital pulses as derived from the output of tape reader 4 into an analog voltage. A representative relay tree is shown and described on pages 108 and 109 of Automatic Digital Calculations by Booth & Booth, published by Butterworth Scientific Publications, London, 1953. More generally, computer 6 refers the coded character to a wired-in table of voltage values more fully described hereinafter from which it reads the delay, in terms of electrical voltage amplitude, required to bring the known element frequency component of a respective character into phase with a timing standard. To accomplish such a result, it is only necessary that a standard relay tree circuit be designed by selecting appropriate values of resistances for the component resistor bleeder network, which supplies the necessary voltages to the relay tree, so that the output therefrom is a voltage of a predetermined amplitude corresponding to the particular pattern of relays energized by the respective outputs of tape reader 4.

The output voltage of computer 6, corresponding in amplitude to the required time delay necessary to bring the element frequency component of a respective character into phase with a timing standard is applied to a first input of pedestal generator 5. Generator 5 may be, for example, a phantastron circuit adapted to be triggered by an input pulse, appearing on line 10, to produce an output wave appearing on line 7, whose leading edge is time coincident therewith and whose trailing edge occurs at a time proportional to the amplitude of the voltage signal applied to its other input by computer 6. The output of generator 5 is applied to tape reader 4 and to a first input of multiple gates 8. The outputs of tape reader 4 which were also applied to computer 6 are also respectively applied to corresponding coincidence gates (AND gates) comprising multiple gates 8.

All of said coincidence gates are simultaneously rendered conductive upon the occurrence of the leading edge of the output signal appearing on line 7, in a conventional manner. Upon such conduction of the coincidence gates, the outputs of tape reader 4 are coupled therethrough to respectively associated elements comprising shifting register 9. The component element stages of shifting register 9 are then "loaded" in parallel and are placed into states of conduction corresponding to the presence of a mark or space signal, appearing on a respectively associated output of tape reader 4.

The output pulse of pedestal generator 5 is also applied to conventional shifting pulse generator 11 producing, in response to the trailing edge thereof, a continuous series of shifting pulses which is applied via line 12 simultaneously to all stages of shifting register 9. Prior to the generation of the shifting pulses, the first of which is coincident in time with the trailing edge of the wave form appearing on line 7, start element 13 of shifting register 9 was placed into a zero state by the output of keying oscillator 14. Thus, upon the application of shifting pulses to the elemental stages of register 9, there appears on line 15, in serial sequence, electrical pulses having amplitudes corresponding to either a mark or space, the first of which is always a space and the next five are determined by the digital number stored in elements 16, 17, 18, 19 and 20.

The shifting pulses are also applied to delay 21, and thence to a second input of element 20 for purposes of resetting said element into a state of one corresponding to a mark. Thus, upon the occurrence of each shifting pulse, a "one" is shifted out of element 20 and through each of the succeeding register elements 19, 18, 17, 16 and 13, and keying stage 22 to produce a continuous mark following the occurrence of the five elements comprising the character and forming the stop pulses or marks as shown in Fig. 1. The stop pulse continues until terminated by the appearance of the next succeeding start pulse coincident in time with the trailing edge of the next succeeding output pulse of pedestal generator 5. The frequency of the shifting pulses produced by generator 11 is preferably adjusted so that a succeeding pulse from oscillator 14 occurs just after the sixth shift pulse.

The pulses appearing on line 15 are applied to modulate the carrier of transmitter 67 which modulated carrier is radiated via antenna 68.

To summarize the operation of Fig. 2, each character of the teletype code message is analyzed prior to transmission in delay computer 6. Computer 6 refers each character to a "wired-in" table of electrical voltages whereby a voltage is selected having an amplitude corresponding to the necessary time delay required to bring the character component frequency in phase with a timing standard upon transmission of the teletype character. The voltage selected by computer 6 varies, by means of pedestal generator 5 and shifting register 9, the time of transmission of each character and, thereby, the duration of the stop element of each respectively preceding character.

Figure 5:
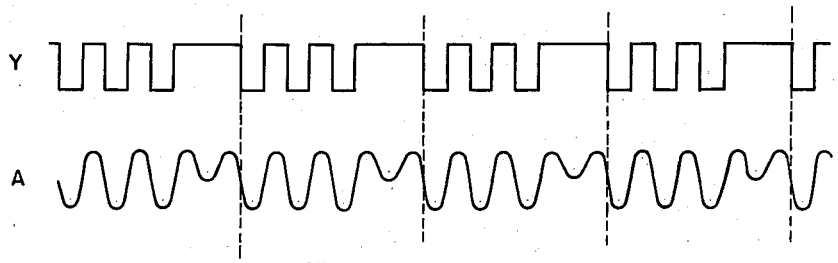
Fig. 5 is a time diagram of a teletype character wave and a harmonic frequency component thereof.

In order to more fully understand the manner in which the element frequency component is brought into the required phase by means of varying the time duration of the stop mark of the transmitted teletype character, reference should be had to Fig. 5.

In Fig. 5, a representative character Y of a standard teletype code is represented by means of a time diagram. In the case of the letter Y, the first element is the usual space, the second element is a mark, the third element is a space, the fourth element is a mark, the fifth element is a space, and the sixth and seventh elements are both marks. Actually, the sixth element is the last of the elements comprising the character proper, while the seventh element is the usual stop mark. Below time diagram Y is wave A illustrating a component signal contained within the transmitted frequency spectrum which is the fourth harmonic of the character transmission frequency.

It is to be noted that the time at which a succeeding start element occurs is determined by the duration of a preceding stop mark. Thus, it can be seen that the phase of wave A may be shifted in time by means of varying the time at which the start element commences, which in turn is dependent upon when the preceding stop mark terminated.

As previously described, the termination of a preceding stop mark is synchronous in time with the occurrence of the trailing edge of the output wave of generator 5 of Fig. 2, which trailing edge triggers the release of a succeeding character from register 9. As also mentioned, the time of occurrence of said trailing edge is controlled by the amplitude of the voltage output of computer 6. Assuming, for purposes of explanation, that computer 6 is in the form of a conventional relay tree digital-to-analogue converter, the manner of adjusting appropriate taps along the component resistor bleeder network thereof will now be described.

As is well known in the art, a discrete point along the component resistor bleeder network will be coupled to the output of a relay tree via the closed contacts of a unique pattern of relays energized in accordance with the digital input thereto. Fig. 6 discloses illustrative apparatus for determining the location of said resistor bleeder taps in order to produce a voltage at the output of computer 6 which will cause a predetermined frequency component at the output of register 9 to reinforce or add in phase from character to character.

In Fig. 6, switch 76 is closed in position B so as to provide a constant bias to pedestal generator 5 in consequence whereof a fixed duration stop pulse is shifted out of register 9. With the exception that a fixed bias is applied to generator 5 rather than the output of computer 6, the operation of transmitter keyer 23 of Fig. 6 is in every respect precisely the same as that of transmitter keyer 23 of Fig. 2. The output of register 9 is coupled via filter 72 to a first input of phase meter 73. Filter 72 is tuned to pass only the frequency component existing at the output of register 9 whose phase is to be stabilized from character to character in accordance with the present invention.

Oscillator 69 operates at the component frequency to be phase stabilized at the output of register 9 and is coupled via filter 71 to a second input of phase meter 73. Filter 71 is designed to pass the same frequency as passed by filter 72. Phase meter 73 operates in a conventional fashion to produce a visual indication of the relative phase displacement between the signals applied to its two inputs.

The output of oscillator 69 is applied to frequency divider 70 whose output, in turn, is applied to pedestal generator 5 and shifting register 9 of transmitter keyer 23 in the same manner as is the case with the output of oscillator 14 of Fig. 2.

An endless tape 74 is prepared for each character of the teletype code alphabet of the illustrated teletype system, including punctuation marks and numerals. The purpose of the endless tape is to produce a continuous succession of the same character at the output of tape reader 4. Phase meter 73 will now read the phase angle of the predetermined frequency component of each respective teletype character relative to the phase of the same frequency as derived from the output of oscillator 69. After the phase of each character is thus determined, the resulting phase angles, indicated by meter 73, are noted, and the character with the most lagging phase angle (relative to the output frequency of oscillator 69) is determined.

Switch 76 is then closed in position A so that the delay or length of the stop pulse is determined by the output of computer 6. Once again, the endless tape for each character is put in tape reader 4 and the corresponding tap of the relay tree (computer 6) resistor bleeder network is adjusted to make the phase of the component frequency output of register 9 corresponding thereto the same as the phase of the most lagging character previously determined by means of meter 73. This procedure is followed for each of the remaining characters in turn whereby a predetermined component frequency at the output of register 9 for each respective character is brought into time phase so that said component frequency will reinforce from character to character.

Figure 3:
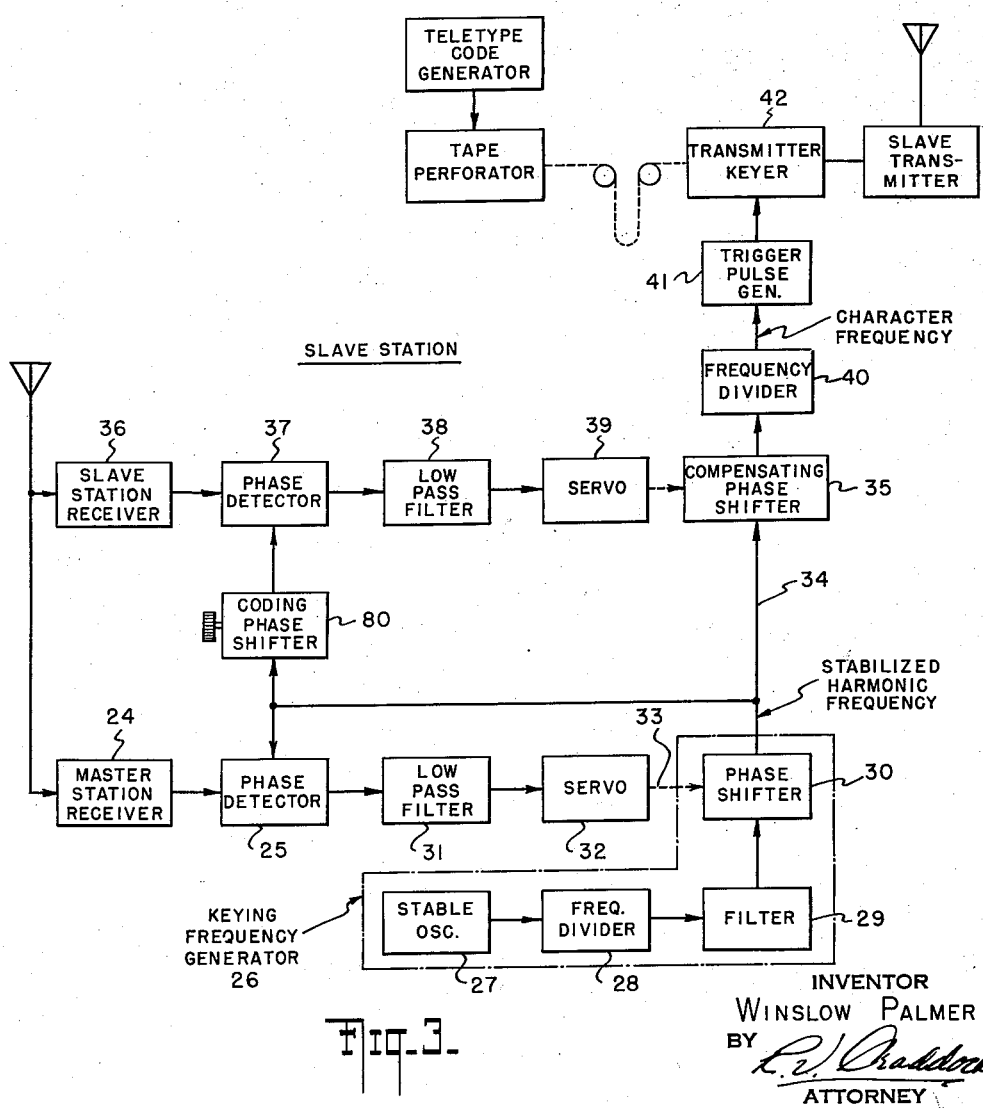
Fig. 3 is a schematic diagram of a slave communication transmitter as modified in accordance with the present invention.

Fig. 3 illustrates a representative slave teletype transmitter, modified in accordance with the present invention, to produce a sequence of transmitted teletype characters having a component element frequency bearing a zero phase relationship relative to the component element frequency transmitted by the master station. Master station receiver 24, consisting of an R.-F. amplifier, I.-F. amplifier and detector, picks up and demodulates a signal from the master transmitter, to which it is tuned. The demodulated signal is applied to a first input of phase detector 25, a reference second input to which is obtained from keying frequency generator 26.

Generator 26 includes a stable oscillator 27, preferably a precision crystal-controlled frequency standard, whose frequency can be adjusted over a small range. Oscillator 27, operating at some convenient high frequency is coupled to frequency divider 28 whose output is passed through filter 29, which produces a sine wave for application to phase shifter 30. Phase shifter 30 might be a conventional resolver with associated phase splitting network connected as a continuous phase shifter in a conventional manner.

The output of phase shifter 30 is applied to the reference input of phase detector 25, as previously mentioned, for phase comparison with the signals from the distant master station to which the local (slave) signals are to be phase synchronized. The phase error signal developed in phase detector 25 is passed through low-pass filter 31 to remove all products of modulation produced in detector 25 excepting a narrow band of frequencies between zero frequency and several cycles per second, for example.

The filtered output of detector 25 is applied as control signal to servo 32 whose mechanical output 33 positions the rotor of phase shifter 30. Servo 32 continues to operate until the output of detector 25 falls to zero whereupon the signal on line 34 at the output of phase shifter 30 is synchronized with a corresponding keying frequency component of the received master station signal, as appears at the output of receiver 24. The synchronized reference signal, appearing on line 34, is passed through a second phase shifter 35, similar to phase shifter 30.

The signal from the local (slave) transmitter is picked up and demodulated by receiver 36 whose output is applied to phase detector 37, a reference signal input to which is derived from coding phase shifter 80. Phase shifter 80 provides for a conventional variable coding delay between the master and slave keying frequency signals in accordance with well established practice in the radio-navigation art, for example, loran. The error signal output from detector 37 is applied to low-pass filter 38 and thence to servo 39 to position the rotor of phase shifter 35, similar to phase shifter 30 in a manner similar to the operation of the above-described master station servo.

The purpose of the slave station servo loop including phase shifter 35 is to compensate for any phase errors arising in the slave transmitter keying operation, phase shifts in the transmitter and antenna coupling network, etc., so that the phase of the signal actually transmitted by the slave station is at the desired phase angle relative to that of the signal received from the distant (master) station.

The output of phase shifter 35, occurring at the stabilized component signal rate is applied to frequency divider 40 whose output occurs at the character keying frequency. The character frequency output of divider 40 triggers pulse generator 41, consisting of a clipper and differentiator which produce trigger pulses in a well known manner for application to transmitter keyer 42 which is equivalent to transmitter keyer 23 previously described in connection with Fig. 2.

Thus, the slave station apparatus operates to detect the master station stabilized frequency component signal and compares it with a locally developed signal for purposes of synchronizing the local signal with the received master signal. The synchronized local signal is then applied to a transmitter keyer, equivalent to the master station transmitter keyer, whereby the stabilized keying frequency component generated by the slave station is phase synchronized with the stabilized keying frequency component transmitted by the master station.

It should be noted that while the master and slave transmitting stations were described with particular emphasis on their navigational function, it has been presumed that they are simultaneously transmitting communication information in the form of a standard teletype code. Moreover, it should be observed that both the master and slave stations may transmit independent teletype messages which can be detected by teletype receivers without any adverse effect attributable to the presence of navigational information in the form of stabilized keying frequency components.

Figure 4:
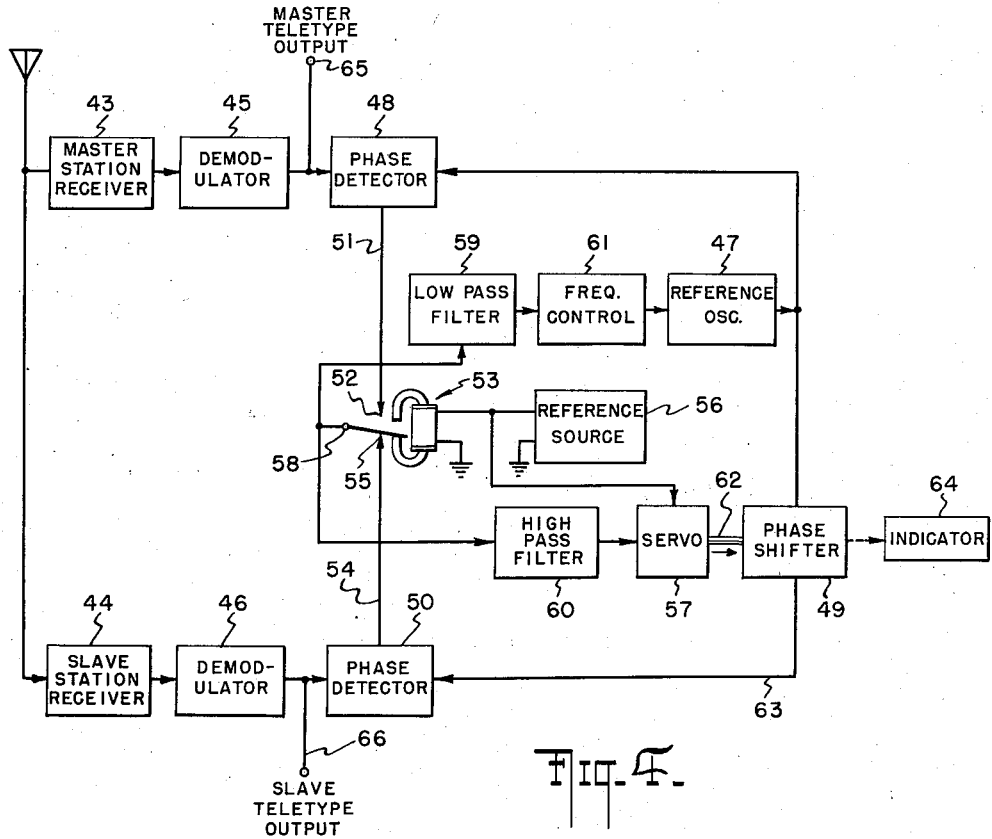
Fig. 4 is a schematic diagram of a receiver adapted to produce individual communication and navigation information outputs according to the present invention.

A receiver, adapted to respond to both the communication and navigational information transmitted by the master and slave stations, is shown in Fig. 4. The transmitted master and slave signals are respectively received and demodulated in master and slave receivers 43 and 44, and demodulators 45 and 46.

Reference oscillator 47 operates at the frequency of the stabilized component signal contained in both the master and slave transmissions. The output of oscillator 47 is directly connected to phase detector 48 as a reference input and indirectly, via phase shifter 49, as a reference input to phase detector 50. The output signal of phase detector 48 on line 51, proportional to the cosine of the phase angle between the reference and master signals, is applied to terminal 52 of single pole, double throw polarized relay 53.

Similarly, the output signal of phase detector 50, appearing on line 54, is applied to terminal 55 of relay 53. Relay 53 is driven at some convenient frequency by the output of reference source 56 whose output is also applied as a reference field excitation input of servo 57.

Thus, there appears at terminal 58 of relay 53, on alternate half cycles of the operation thereof, the output signals from phase detectors 48 and 50. Terminal 58 is conductively coupled to both low-pass filter 59 and high-pass filter 60.

The D.-C. component of the signal appearing on terminal 58 is proportional to the sum of the outputs of detectors 48 and 50 while the A.-C. component thereof is proportional to the difference between the outputs of said phase detectors. The D.-C. component is isolated and passed in filter 59 and applied to frequency control 61 for purposes of synchronizing oscillator 47 with the stabilized keying frequency component transmitted by the master station.

The A.-C. component of the signal appearing on terminal 58 of relay 53 is isolated and passed by high-pass filter 60 whose output is connected to the signal control input of servo 57. Servo 57 produces a mechanical output 62 to drive the rotor of phase shifter 49. As a result, the electrical output of phase shifter 49, appearing on line 63, is phase synchronized with the stabilized keying frequency component signal transmitted by the slave station once oscillator 47 has been synchronized with the corresponding master station component signal as previously described. The mechanical shaft 62 output of servo 57 assumes a displaced position proportional to the phase difference between the stabilizing keying frequency components transmitted by both master and slave stations. This mechanical equivalent of said phase difference is transformed in indicator 64, which may be a conventional Veeder root counter into the numeral equivalent in microseconds, for example, of the phase error.

Indicator 64 may then be employed with standard navigation charts, similar to those utilized in a loran system, for purposes of determining the particular phase contour on which the vehicle-borne navigation receiver is located. As is well recognized in navigation art, it is necessary that a second phase reading be obtained by means of signals transmitted, for example, by the same master station and a second slave station to establish a second phase contour on which the receiver is also located. The intersection of the two phase contours, as shown on the navigation chart being employed, then locates the point within the service area of the navigation system at which the receiver is located.

The navigation receiver of Fig. 4 also produces at terminals 65 and 66, respectively, master and slave station demodulated teletype signals, which may be directly applied to respective conventional teletype receivers for purposes of recovering the transmitted communication information.

From the preceding description, it can be seen that the objects of the present invention have been achieved by the provision of master and slave teletype transmitter stations, each transmitting signals having a common frequency component related to the character keying rate. The common signal component is phase synchronized between the master and slave stations, by means of the present invention, to produce in addition to the already existing communication information, stabilized signals for navigational purposes. A receiver is provided by the present invention to utilize the phase stabilized signal components to derive information for establishing the position of the receiver while simultaneously providing separate outputs at which the master and slave teletype communication information is available.

It should be noted that while a Start-Stop teletype system of coding has been described for illustrative purposes, other types of coded transmission may be employed. The invention lies in the production of successive groups of modulating pulses, each group being so positioned in time relative to every other group that a common component frequency of the groups is phase stabilized over a succession of groups. The particular manner of modulating the carrier wave of the system, propagated between stations, is not of material consequence to the present invention and forms no part thereof.

Additionally, the invention is not limited to the use of such pulse storage means as perforated tapes and shifting registers shown in the preferred embodiment of the drawings. Other pulse storage means, well known in the art, may be employed such as, for example, magnetic tapes, magnetic drums, electrostatic storage tubes and counter tubes.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A dual purpose signalling system comprising a first transmitter for transmitting a first grouped succession of modulated signals, said first groups containing a frequency component, related to the group repetition rate, whose phase is stabilized from group to group; at least a second transmitter including means for generating a second grouped succession of modulated signals, said second groups containing said frequency component whose phase is stabilized from group to group, means for synchronizing said frequency component of the generated signal groups with said frequency component of the transmitted signal group, whereby a predetermined phase relationship is established between said frequency components, and means for transmitting the second signal groups containing said synchronized frequency component; and receiving means including demodulating means separately responsive to said transmitted first and second signal groups for recovering the modulation thereon and producing the same at respective outputs, means for extracting said frequency component from each of said signal groups and means for comparing the phases of said extracted frequency components.

2. Apparatus as defined in claim 1 wherein said first transmitter comprises means for stabilizing the phase of a predetermined frequency component of said first grouped succession of modulated signals relative to the time of occurrence of a reference signal, said reference signal occurring at the group repetition rate, comprising means for generating a reference signal, means for generating a succession of modulated signals, first means for storing said modulated signals, first means for releasing said stored signals in groups of predetermined number in response to a second characteristic of a first control signal, means for producing for each group of released signals a second control signal having a characteristic proportional to the requisite time delay for bringing a predetermined frequency component of said second grouped signals into a predetermined phase relationship with the time of occurrence of said reference signal, means responsive to said reference signal and said characteristic of said second control signal for producing said first control signal, the first control signal having a first characteristic determined by the time of occurrence of said reference signal and having said second characteristic determined by said characteristic of said second control signal, means responsive to said first chaaracteristic of said first control signal for selectively coupling said released grouped signals to a second storage means, second means for releasing the signals stored in said second storage means, and means for coupling said first control signal to said second releasing means, said second releasing means being responsive to said second characteristic of said first control signal for releasing the signals stored in said second storage means.

3. Apparatus as defined in claim 1 wherein said second transmitter comprises means for receiving said first grouped succession of modulated signals, filter means coupled to said receiving means for extracting said stabilized frequency component, means for generating a reference signal having the same frequency as that of said stabilized component, phase comparator means having a first input coupled to the output of said filter means and a second input adapted to receive said reference signal to produce an output signal having a characteristic proportional to the phase difference between the two input signals, null-seeking servo means responsive to said output signal and coupled to said means for generating said reference signal for varying the phase thereof, means for generating a second succession of modulated signals, first means for storing said modulated signals, first means for releasing said stored signals in groups of predetermined number in response to a second characteristic of a first control signal, means for producing for each group of released signals a second control signal having a characteristic proportional to the requisite time delay for bringing a predetermined frequency component of said second grouped signals into a predetermined phase relationship with the time of occurrence of said reference signal, means responsive to said reference signal and said characteristic of said second control signal for producing said first control signal, the first control signal having a first characteristic determined by the time of occurrence of said reference signal and having said second characteristic determined by said characteristic of said second control signal, means responsive to said first characteristic of said first control signal for selectively coupling said released grouped signals to a second storage means, means for releasing the signals stored in said second storage means, means for coupling said first control signal to said second releasing means, said second releasing means being responsive to said second characteristic of said first control signal for releasing the signals stored in said second storage means, a carrier oscillator, means for modulating said carrier oscillator, and means for applying said signals released from said second storage means to said means for modulating.

4. Means for stabilizing the phase of a predetermined frequency component of a grouped succession of modulated signals relative to the time of occurrence of a reference signal comprising means for generating a reference signal having a predetermined repetition rate, means for generating a succession of modulated signals, first means for storing said modulated signals, first means for releasing said stored signals in groups of predetermined number in response to a second characteristic of a first control signal, means for producing for each group of released signals a second control signal having a characteristic proportional to the requisite time delay for bringing a predetermined frequency component of said grouped signals into a predetermined phase relationship with the time of occurrence of said reference signal, means responsive to said reference signal and said characteristic of said second control signal for producing said first control signal, said first control signal having a first characteristic determined by the time of occurrence of said reference signal and having said second characteristic determined by said characteristic of said second control signal, means responsive to said first characteristic of said first control signal for selectively coupling said released grouped signals to a second storage means, second means for releasing the signals stored in said second storage means, and means for coupling said first control signal to said second releasing means, said second releasing means being responsive to said second characteristic of said first control signal for releasing the signals stored in said second storage means.

5. Means for stabilizing the phase of a predetermined frequency component of a grouped succession of pulse modulated signals relative to the time of occurrence of a reference signal comprising means for generating a reference signal having a predetermined repetition rate, means for generating a succession of pulse modulated signals, first means for storing said modulated signals, first means for releasing said stored signals in groups of predetermined number in response to a second characteristic of a first control signal, each said released signal appearing on a respective output of said first releasing means, means for producing for each group of released signals a second control signal having a characteristic proportional to the requisite time delay for bringing a predetermined frequency component of said grouped signals into a predetermined phase relationship with the time of occurrence of said reference signal, means responsive to said reference signal and said characteristic of said second control signal for producing said first control signal, said first control signal having a first characteristic determined by the time of occurrence of said reference signal, and having said second characteristic determined by said characteristic of said second control signal, second storage means having a plurality of inputs corresponding in number to the number of outputs of said first releasing means, means responsive to said first characteristic of said first control signal for selectively coupling each of the respective outputs of said first releasing means to a connesponding input of said second storage means, second means for releasing in time sequence signals stored in said second storage means, means for coupling said first control signal to said second releasing means, said second releasing means being responsive to said second characteristic of said first control signal for releasing the signal stored in said second storage means, a carrier oscillator, means for modulating said carrier oscillator, and means for applying said signals released from said second storage means to said means for modulating.

6. Means for stabilizing the phase of a predetermined frequency component of a grouped succession of pulse modulated signals relative to the time of occurrence of a reference signal comprising means for generating a reference signal having a predetermined repetition rate, means for generating a succession of pulse modulated signals, first means for storing said modulated signals, first means for releasing said stored signals in groups of predetermined number in response to the trailing edge of a control pulse, each said released signal occurring on a respective output of said first releasing means, means for producing for each group of released signals a control voltage having an amplitude proportional to the requisite time delay for bringing a predetermined frequency component of said grouped signals into a predetermined phase relationship with the time of occurrence of said reference signal, means responsive to said reference signal and said amplitude of said control voltage for producing said control pulse, said control pulse having a leading edge determined by the time of occurrence of said reference signal and having a trailing edge whose occurrence in time is determined by the amplitude of said control voltage, second storage means having a plurality of inputs corresponding in number to the number of outputs of said first releasing means, means responsive to the leading edge of said control pulse for selectively coupling each of the respective outputs of said first releasing means to a corresponding input of said second storage means, second means for releasing in time sequence the signals stored in said second storage means, and means for coupling said control pulse to said second releasing means, said second releasing means being responsive to the trailing edge of said control pulse for releasing the signals stored in said storage means at a time corresponding thereto.

7. Means for stabilizing the phase of a frequency component of a grouped succession of modulated signals relative to the time of occurrence of a first reference signal and for synchronizing with the phase of said stabilized frequency component the phase of a second reference signal of the same frequency as said component frequency comprising means for generating a first reference signal, means for generating a succession of modulated signals, first means for storing said modulated signals, first means for releasing said stored signals in groups of predetermined number in response to a second characteristic of a first control signal, means for producing for each group of released signals a second control signal having a characteristic proportional to the requisite time delay for bringing a predetermined frequency component of said grouped signals into a predetermined phase relationship with the time of occurrence of said first reference signal, means responsive to said first reference signal and said characteristic of said second control signal for producing said first control signal, said first control signal having a first characteristic determined by the time of occurrence of said first reference signal and having said second characteristic determined by said characteristic of said second control signal, means responsive to said first characteristic of said first control signal for selectively coupling said released grouped signals to a second storage means, second means for releasing the signals stored in said second storage means, means for coupling said first control signal to said second releasing means, said second releasing means being responsive to said second characteristic of said first control signal for releasing the signals stored in said second storage means, filter means adapted to receive the signals released by said second releasing means and operative to produce an output containing substantially only said predetermined frequency component of said released signal, means for generating a second reference signal, phase comparator means having a first input coupled to the output of said filter means and a second input adapted to receive said second reference signal to produce an output signal having a characteristic proportional to the phase difference between the two input signals, and null-seeking servo means responsive to the characteristic of said output signal and coupled to said means for generating said second reference signal for varying the phase of said second reference signal.

8. Means for receiving a grouped succession of modulated signals having a frequency component of stabilized phase and for synchronizing therewith a stabilized frequency component of a locally generated grouped succession of modulated signals comprising means for receiving said grouped signals including filter means for extracting said stabilized frequency component, means for generating a first reference signal having the same frequency as that of said stabilized component, phase comparator means having a first input coupled to the output of said filter means and a second input adapted to receive said first reference signal to produce an output signal having a characteritsic proportional to the phase difference between the two input signals, null-seeking servo means responsive to said output signal and coupled to said means for generating said first reference signal for varying the phase thereof, a frequency divider coupled to the output of said means for generating said first reference signal to produce a second reference signal, means for locally generating a second succession of modulated signals, first means for storing said modulated signals, first means for releasing said stored signals in groups of predetermined number in response to a second characteristic of a first control signal, means for producing for each group of released signals a second control signal having a characteristic proportional to the requisite time delay for bringing a predetermined frequency component of said second grouped signals into a predetermined phase relationship with the time of occurrence of said second reference signal, means responsive to said second reference signal and said characteristic of said second control signal for producing said first control signal, the first control signal having a first characteristic determined by the time of occurrence of said second reference signal and having said second characteristic determined by said characteristic of said second control signal, means responsive to said first characteristic of said first control signal for selectively coupling said released grouped signals to a second storage means, second means for releasing the signals stored in said second storage means, and means for coupling said first control signal to said second releasing means, said second releasing means being responsive to said second characteristic of said first control signal for releasing the signals stored in said second storage means.

9. Means for receiving a grouped succession of modulated signals having a frequency component of stabilized phase and for synchronizing therewith a stabilized frequency component of a locally generated grouped succession of modulated signals comprising means for receiving said grouped signals including filter means for extracting said stabilized frequency component, means for generating a reference signal having the same frequency as that of said stabilized component, phase comparator means having a first input coupled to the output of said filter means and a second input adapted to receive said reference signal to produce an output signal having a characteristic proportional to the phase difference between the two input signals, null-seeking servo means responsive to said output signal and coupled to said means for generating said reference signal for varying the phase thereof, means for locally generating a second succession of modulated signals, first means for storing said modulated signals, first means for releasing said stored signals in groups of predetermined number in response to a second characteristic of a first control signal, means for producing for each group of released signals a second control signal having a characteristic proportional to the requisite time delay for bringing a predetermined frequency component of said second grouped signals into a predetermined phase relationship with the time of occurrence of said reference signal, means responsive to said reference signal and said characteristic of said second control signal for producing said first control signal, the first control signal having a first characteristic determined by the time of occurrence of said reference signal and having said second characteristic determined by said characteristic of said second control signal, means responsive to said first characteristic of said first control signal for selectively coupling said released grouped signals to a second storage means, second means for releasing the signals stored in said second storage means, and means for coupling said first control signal to said second releasing means, said second releasing means being responsive to said second characteristic of said first control signal for releasing the signals stored in said second storage means.

10. Apparatus comprising means for receiving at least two different modulated signals, each signal being transmitted in grouped succession, each group of each signal containing a common frequency component bearing a predetermined phase relationship with respect to that of every other group of the same signal, first individual means coupled to said receiving means for extracting the modulation of a respective one of said signals and for producing the same at separate outputs, second individual means coupled to the output of said first individual means for extracting said common frequency component of a respective one of said signals, and means for comparing the phases of said extracted frequency components.

No references cited.